United States Patent [19]

Inomata et al.

[11] 3,994,868

[45] Nov. 30, 1976

[54] HYDROGENATION OF POLYHYDROXYLUNSATURATED HYDROCARBON POLYMERS

[75] Inventors: Jihei Inomata, Komae; Susumu Michishima; Kanji Kasahara, both of Yokohama; Seiichi Hino; Satoru Igarashi, both of Kawasaki; Naoki Takamiya, Tokyo; Tatsuo Tani, Yokohama, all of Japan

[73] Assignee: Mitsubishi Chemical Industries Ltd., Tokyo, Japan

[22] Filed: Dec. 13, 1974

[21] Appl. No.: 532,697

[30] Foreign Application Priority Data

Dec. 14, 1973 Japan............................. 48-139784

[52] U.S. Cl.............................. 526/13; 260/96 HY; 526/20; 526/25
[51] Int. Cl.².......................... C08F 8/04; C08F 6/00
[58] Field of Search...... 260/94.7 H, 96 HY, 635 R, 260/635 A, 635 D, 82.1, 85.1

[56] References Cited

UNITED STATES PATENTS

| 2,838,478 | 6/1958 | Hillyer et al. ...................... 260/85.1 |
| 2,877,212 | 3/1959 | Seligman............................ 260/77.5 |
| 3,454,644 | 7/1969 | Dewhirst........................... 260/570.9 |
| 3,459,814 | 8/1969 | Kovach et al...................... 260/635 |

OTHER PUBLICATIONS

Science & Technology, vol. 7, Hydrogenation pp. 557–568, Interscience Publishers; 1967.

*Primary Examiner*—John Kight, III
*Attorney, Agent, or Firm*—Oblon, Fisher, Spivak, McClelland & Maier

[57] ABSTRACT

A polyhydroxylunsaturated hydrocarbon polymer is hydrogenated over a ruthenium catalyst to produce a polyhydroxyl saturated hydrocarbon polymer.

9 Claims, No Drawings

HYDROGENATION OF POLYHYDROXYLUNSATURATED HYDROCARBON POLYMERS

BACKGROUND OF THE INVENTION

1. Field of the Invention:

The present invention relates to the hydrogenation of polyhydroxylunsaturated hydrocarbon polymers (hereinafter referred to as unsaturated polymers).

2. Description of the Prior Art:

It is known that saturated polymers produced by the hydrogenation of unsaturated polymers provide hard polymers which have high stability and at high temperatures deteriorate and exhibit a low degree of coloring. The polymers also possess high weather durability, ozone or oxidation resistance and light-fastness and have stable physical properties such as modulus, elongation and tensile strength. In the hydrogenation of the unsaturated polymers nickel and certain noble metals have been used as catalysts for the hydrogenation reaction. Catalysts of nickel or palladium have been practically used. However, when the nickel catalyst is used, the rate of the hydrogenation reaction is slow, especially so in the later stages of the hydrogenation reaction and so it is disadvantageous to use the catalyst from the economical viewpoint. When a palladium catalyst is used, the rate of the hydrogenation is high enough, however the palladium catalyst facilitates the removal of the terminal hydroxyl group from the polymer. Accordingly, when the resulting saturated polymer is cross-linked with a polyisocyanate, the cross-linking reaction is not smooth and the desired tight polymer useful for industrial purposes is difficult to obtain. Furthermore, the elimination of the hydroxyl group has not been prevented by varying the reaction conditions such as the temperature and the reaction period.

A need, therefore, continues to exist for a method of hydrogenating hydroxyl containing unsaturated polymers while avoiding the elimination of the terminal hydroxyl groups from the polymer.

SUMMARY OF THE INVENTION

Accordingly, one object of the present invention is to provide a method of hydrogenating polyhydroxylunsaturated hydrocarbons at high rates without the elimination of the terminal hydroxyl groups from the polymer.

Briefly, this object and other objects of the invention as hereinafter will become more readily apparent can be attained by the hydrogenation of a polyhydroxylunsaturated hydrocarbon polymer by hydrogenating the unsaturated polymer in the presence of a ruthenium catalyst.

DETAILED DESCRIPTION OF THE PREFERRED EMBODIMENTS

The unsaturated polymers which are used as a raw material for the hydrogenation reaction of the invention include unsaturated polymers having at least one hydroxyl group, preferably a diene unsaturated polymer, especially a conjugated diene unsaturated polymer, which can be prepared by conventional methods. For examples, suitable unsaturated polymers include those prepared by polymerizing a conjugated diene monomer such as 1,3-butadiene, 1,3-pentadiene, 2,3-dimethylbutadiene, phenylbutadiene, isoprene, or the like. It is also possible to use copolymers prepared from a conjugated diene and a comonomer as a starting material. Suitable comonomers include compounds containing a polymerizable unsaturated bond such as styrene, vinyltoluene, vinylnaphthalene, methylstyrene, divinylbenzene, cumarone, indene, vinylpyridine, cinnamic acid, cinnamic ester, vinylfuran, vinylphenol, vinylbenzoic acid, acrylonitrile, methacrylonitrile, methylacrylate, ethylacrylate, hydroxyethylacrylate, hydroxyethylmethacrylate, acrylic acid, methacrylic acid, or the like. The comonomer is added to the conjugated diene in amounts less than 95 wt %, preferably less 75 wt %.

When a comonomer having an unsaturated ring such as an aromatic ring, furan ring, or the like, is added to the conjugated diene in the copolymerization reaction and the copolymer is hydrogenated in accordance with the technique of the invention, it is possible to hydrogenate the double bonds in the main chain of the polymer without breaking the main chain and severing the hydroxyl groups and also it is possible to hydrogenate the double bonds of the unsaturated ring to form the corresponding saturated ring compound. The cured products of the resulting copolymer possess saturated rings and have excellent mechanical properties and electronic characteristics. The copolymers also have low crystallizability, excellent elasticity and low dielectric constants, and have high arc resistance compared to other cured products which have no saturated rings. Thus, the cured products are more preferable than the others as electrical insulating materials.

The techniques of polymerizing the monomers include radical polymerization initiated with a peroxide or azobis catalyst compound having a functional group such as $\beta,\beta'$-azobis ($\beta$-cyano)-n-propanol, $\delta,\delta'$-azobis ($\delta$-cyano)-n-pentanol in a solvent of an alcohol, a ketone, an ester, or the like. Another suitable polymerization technique is anionic polymerization using a catalyst of an alkali metal such sodium, lithium or a complex of an alkali metal and a polycyclic aromatic compound, which attains a functional group by reaction with an alkyleneoxide, epichlorohydrin, or the like. Suitable catalysts used in the anionic polymerization include lithium complexes such as a lithium naphthalene complex, an anthracene complex, a biphenyl complex; and dialkali metal hydrocarbons such as 1,4-dialkali metal butane, 1,5-dialkali metal pentane, 1,10-dialkali metal decane and 1,4-dialkali metal 1, 1, 4, 4-tetraphenyl butane. In order to smoothly conduct the anionic polymerization, a solvent such as a hydrocarbon, e.g., hexane, heptane, benzene, toluene, xylene, cyclohexane, or the like can be used.

When an alkali metal is used as the catalyst, the hydrocarbon solvent is preferably combined with a Lewis base having a relatively low polarity, such as diethyl ether, dipropyl ether, ethyl propyl ether, ethyl butyl ether, or the like.

The polyhydroxyl diene polymer can be obtained by reacting the resulting living polymer with an epoxy compound and treating the product with a protonic acid such as hydrochloric acid, sulfuric acid, acetic acid, or the like. The epoxy compounds used in the reaction include monoepoxy compounds such ethyleneoxide, propyleneoxide, butyleneoxide, cyclohexeneoxide, styreneoxide, phenylglycidyl ether,; polyepoxy compounds such as bisphenol A-diglycidyl ether, vinylcyclohexenediepoxide, butadienediepoxide, dicyclopentadienediepoxide, limonenediepoxide, ethyleneglycol-bisepoxide, and the like; and haloepoxy compounds such as epichlorohydrin, epibromohydrin, methylepichlorohydrin, and the like. The polyepoxides and haloepoxides are especially preferable. The amount of the epoxy compound used is usually greater than an equimolar ratio based on the polymer, especially greater than a mole ratio of 2 based on the polymer in the case of the monoepoxy compound. It is believed that the epoxy compound adds to both terminals of the living polymer under the ring cleavage, and the hydrogen atom of the hydroxyl group formed by ring cleavage is substituted by an alkali metal in the combination.

On the other hand, when a polyepoxide or a haloepoxide is used, the amount of the epoxy compound selected depends upon the use of the polymer as a function of the desired molecular weight and the number of hydroxyl groups in the polymer, and is usually a 0.5 – 2 mole ratio, preferably a mole ratio of 0.6 – 1.7 of the polyepoxide or the haloepoxide to the living polymer. As an example, a living polymer, after ring cleavage of the epoxy compound, chiefly reacts to form a polymer composed of several molecules of the living polymer bonded through the epoxy compound and having an alkali metal substituted hydroxyl group. It is also possible to obtain a polyhydroxylpolydiene by oxidizing the polydiene by ozonolysis (ozone addition and decomposition) followed by reduction.

In the invention, the unsaturated diene polymer can be used as a raw material, and an unsaturated polymer prepared by radical polymerization is especially preferable. When the anionic polymerization technique is used with sodium to give an unsaturated polymer having a high 1,2-bond content in the micro structure, the hydrogenation conditions are not limited as much. However, in the case of radical polymerization or anionic polymerization using lithium, the unsaturated polymer has a high 1,4-bond content of greater than 50%, especially greater than 70% in the micro structure. Accordingly, the crystallinity of the polymer is high which imparts high strength and elongation and the conditions of hydrogenation are limited. The process of the invention can be applied to the hydrogenation of various unsaturated polymers, and can be especially effective for the preparation of conjugated diene unsaturated polymers having a high 1,4-bond content because of the above reason. The saturated polymer can be easily obtained by the hydrogenation of the unsaturated polymer with molecular hydrogen in the presence of the ruthenium catalyst.

The ruthenium catalyst of the present invention is used in the form of metallic ruthenium such as ruthenium black, in the form of a catalyst supported on a carrier or in the form of a ruthenium complex. When it is supported on the carrier, ruthenium oxide, ruthenium halide or a ruthenium salt of an organic acid can be used. Suitable carriers include carbon, alumina, silica, silica-alumina, diatomaceous earth, barium carbonate, calcium carbonate, and the like. In the case of the supported catalysts, the amount of ruthenium supported on the carrier is usually in the range of 0.1 – 40 wt %, preferably 0.2 – 15 wt %.

The unsaturated polymer can be directly hydrogenated with hydrogen in the presence of the ruthenium type catalyst. However, superior hydrogenation results can be obtained when the reaction is conducted in a solvent. Suitable solvents include aliphatic hydrocarbons such as hexane, heptane, octane, cyclohexane and methylcyclohexane; aromatic hydrocarbons such as benzene, toluene and xylene; alcohols such as n-propyl alcohol, isopropyl alcohol and n-butyl alcohol; ethers such as diethyl ether, dipropyl ether and tetrahydrofuran; esters such as ethylacetate and butylacetate; water and mixtures thereof. When the hydrogenation is conducted in a mixture of water and an organic solvent, the rate of hydrogenation of the polymer can be substantially increased without causing any appreciable removal of the hydroxyl groups. The amount of water used is determined by the type of organic solvent used and the rate required for hydrogenation, and is usually in a range of 0.003 – 500 wt %, preferably 1 – 300 wt % based on the organic solvent.

When a mixture of water and the organic solvent is used as the solvent, it is possible to produce a hydrogenated polymer at higher rates of hydrogenation which is economically advantageous. Further advantages gained include a decrease in the amount of the organic solvent, a decrease in the loss of the solvent, the omission of a drying step for the solvent, direct recycling of the solvent by steam stripping recovery and the like.

The ruthenium complexes used as the catalyst include $\alpha$-dichloro-$\pi$-benzene ruthenium (II), dichloro-tris(triphenylphosphine) ruthenium (II), hydridochloro-tris(trisphenylphosphine) ruthenium (II), ruthenium tetrachloride dihydrate, ruthenium pentachloride hydrate, ruthenium hexachloride, and the like. The ruthenium complex can be used in a homogeneous system by dissolving it in a solvent. The amount of the ruthenium complex used in the hydrogenation can be small so that it is possible to omit the step of separating the catalyst from the hydrogenated polymer, and preferably ranges from 0.01 – 1.00 wt % based on the unsaturated polymer. The reaction temperature is preferably 20 – 150° C. If the reaction temperature is too high, the rate of hydrogenation is increased. However, the elimination of hydroxyl groups becomes a factor at these temperatures. Hydrogen can be fed into the flow system under normal pressures or high pressures such as 1 – 200kg/ cm$^2$, preferably 5 — kg/cm$^2$ and the hydrogenation can be conducted in any system such as a fixed bed system, a suspension system, a homogeneous system, or the like.

In the process of the invention, at least 50%, preferably more than 80% of the unsaturated portions of the unsaturated polymer are hydrogenated. The number of hydroxyl groups per molecule is not significantly changed. Because few hydroxyl groups are eliminated under these conditions, it is possible to conduct curing of the polymer by reaction with a agent of a polyisocyanate, or the like. When the polymer is cured, it is possible to reinforce or to improve the polymer by adding a filler such as carbon black, hydrated silica, clay, talc, organic fiber or glass fiber.

Having generally described this invention, a further understanding can be obtained by reference to certain specific examples which are provided herein for purposes of illustration only and are not intended to be limiting unless otherwise specified.

Example 1

Into a 200 ml autoclave were charged 50.0g of a polyhydroxylpolybutadiene [manufactured by Arco; R-45HT Mn 3110, (-OH) content of 0.82 meq/g, 15% cis-1,4, 58% trans-1,4, 27% vinyl], 50.0g of cyclohexane, and 5.0g of a catalyst of ruthenium supported by carbon (5% ruthenium, manufactured by Nippon Engelhault). The autoclave was purged with purified argon a and the contents were heated to 100° C over 30 minutes. At 100° C, as a normal state, pure hydrogen gas was fed into the autoclave and maintained under a pressure of 50 kg/cm² for the hydrogenation reaction. After a predetermined period, the hydrogenated product was removed and the catalyst was separated by filtration. The solvent was evaporated and the product was purified by reprecipitation from a toluene-methanol medium. The product was dried at 55° C in vacuum to obtain 40.3g of the hydrogenated product. The results of the analysis of the resulting hydrogenated polymer are shown in Table 1.

Example 2

The process of Example 1 was repeated except that a catalyst of ruthenium supported on alumina (5% ruthenium) was used for hydrogenation and the hydrogenated polymer was obtained. The results of the analysis thereof are shown in Table 1.

Reference Examples 1 - 7

The process of Example 1 was repeated except that other noble metal catalysts were used and the hydrogenated polymers were obtained. The results of the analysis thereof are shown in Table 1.

content of the polymer similar to that of Examples 1 - 2, but the rates of hydrogenation are low so that these catalysts cannot be practically applied.

Curing Operation

The polyhydroxyl hydrogenated polymers of Examples 1 and 2 and Reference Examples 1 - 7 were cured with a diisocyanate. Ten gram samples of each of the polyhydroxyl hydrogenated polymers were admixed with 0.01g of dibutyl-tin dilaurate and tolylenediisocyanate in a ratio of NCO/OH of 1.1, and the reaction was conducted at 100° C under the pressure of 150kg/cm² for 2 hours. The polyhydroxyl hydrogenated polymers obtained by the processes of Reference Examples 1 –4, gave inferior cured products as the number of hydroxyl groups per polymer molecule was low. The physical properties of the cured polymers prepared by curing the polyhydroxyl hydrogenated polymers of Examples 1 and 2 and Reference Examples 5 - 7 are shown in Table 2. As it is clear from the data of Table 2, the physical properties of the cured polymer of the invention are significantly superior to the properties of the Reference Examples.

TABLE 2

Physical properties of cured polymers:

| Sample | tolylene diisocyanate (g) | tensile strength (kg/cm²) | elongation (%) | modulus(kg/cm²) 100% | modulus(kg/cm²) 300% | Hardness (JIS) |
|---|---|---|---|---|---|---|
| Example 1 | 0.76 | 94.3 | 363 | 42.1 | 75.6 | 81 |
| Example 2 | 0.74 | 90.2 | 408 | 39.8 | 70.4 | 80 |
| Reference 5 | 0.79 | 12.4 | 218 | 5.7 | — | 39 |
| Reference 6 | 0.75 | 13.2 | 225 | 5.9 | — | 41 |
| Reference 7 | 0.76 | 52.5 | 280 | 18.8 | — | 64 |

Preparation of Polymer 1

Into a 500ml autoclave were charged 75g of 1,3-

TABLE 1

Analysis of hydrogenated polymers

| | Hydrogenation catalyst [*1] | Average [*3] molecular weight | Period of hydrogenation (hr.) | Extent of [*4] hydrogenation (%) | OH group content (meq/g) | [OH]number/ polymer molecule | Solvent type [*2] | Solvent amount (g) |
|---|---|---|---|---|---|---|---|---|
| Example 1 | 5% Ru-C | 3200 | 10 | 99.4 | 0.79 | 2.5 | CHX | 50 |
| Example 2 | 5% Ru-A | 3250 | 10 | 99.1 | 0.77 | 2.5 | CHX | 50 |
| Reference 1 | 5% Pd-C | 3200 | 6.0 | 96.9 | 0.54 | 1.7 | CHX | 50 |
| " 2 | 3% Pd-C | 3250 | 7.7 | 92.1 | 0.53 | 1.7 | CHX | 100 |
| " 3 | 2% Pd-C | 3250 | 6.0 | 91.3 | 0.48 | 1.6 | THF | 80 |
| " 4 | 5% Rh-C | 3200 | 2.2 | 57.6 | 0.50 | 1.6 | CHX | 100 |
| " 5 | 5% Os-C | 3280 | 2.0 | 2.4 | 0.80 | 2.8 | CHX | 100 |
| " 6 | 2% Pt-C | 3250 | 12.8 | 17.9 | 0.80 | 2.6 | CHX | 100 |
| " 7 | 46% Ni-K | 3250 | 10.0 | 56.4 | 0.80 | 2.6 | CHX | 100 |

[*1]Catalyst:
Ru-C : ruthenium supported on carbon;
Pd-C : palladium supported on carbon;
Os-C : osmium supported on carbon;
Ni-K: nickel-diatomeous earth
[*2]Solvent:
CHX : cyclohexane;
THF : tetrahydrofuran
Ru-A : ruthenium supported on alumina;
Rh-C : rhodium supported on carbon;
Pt-C : platinium supported on carbon;
[*3]Average molecular weight is measured by Vapour Pressure Osmometer.
[*4]Rate of hydrogenation is measured by Infrared analysis.

It is clear from the data of Table 1, that a high rate of hydrogenation is obtained in Reference Examples 1 –4 though the hydrogenation period is relatively short. However, the OH content of the polymers is quite low, which shows that the conventional catalysts promote the elimination of OH groups. On the other hand, the processes of Reference Examples 5 - 7 give an OH butadiene, 25g of styrene, 70g of isopropyl alcohol, and 10g of 60% hydrogen peroxide in an argon atmosphere at room temperature, and the mixture was heated to 90° C. The polymerization was performed at 90° C for 5 hours and the reaction product was cooled. The unreacted monomer was removed and the resulting copolymer was isolated, taken up and dried. The resulting butadiene-styrene copolymer had an average molecular weight of 3360, an OH group content of 0.58 meq/g and a styrene content of 17 wt %.

Preparation of Polymer 2

The process of the Preparation of Polymer 1 was repeated by mixing 64g of 1,3-butadiene, 36g of styrene, 70g of isopropylalcohol and 8g of 60% hydrogen peroxide. The mixture was polymerized at 120° C for 2 hours. The resulting copolymer had an average molecular weight of 2910, an OH group content of 0.67 meq/g and a styrene content of 29 wt %.

Preparation of Polymer 3

The process of the Preparation of Polymer 1 was repeated by mixing 100g of 1,3-butadiene, 100g of styrene, 70g of isopropylalcohol and 10g of 60% hydrogen peroxide. The mixture was polymerized under the same conditions. The resultinc copolymer had an average molecular weight of 3700, an OH group content of 0.55 meq/g and a styrene content of 36 wt %. The copolymer was a highly viscous liquid.

Preparation of Polymer 4

The process of Preparation of Polymer 1 was repeated by mixing 100g of 1,3-butadiene, 70g of isopropyl alcohol and 10g of 60% hydrogen peroxide. The mixture was polymerized at 90° C for 5 hours. The resulting polymer had an average molecular weight of 2600 and an OH group content of 0.85 meq/g.

Example 3

Into a 200ml autoclave were charged 50g of Polymer 1, 50g of cyclohexane and 5g of catalyst of ruthenium supported on carbon (5% ruthenium manufactured by Nippon Engelhault). The autoclave was purged with purified argon and the contents were heated to 100° C.

Hydrogenation of the copolymer was performed by feeding hydrogen gas into the autoclave to a pressure of 50 kg/cm$^2$, and heating to 100° C. Hydrogen gas was continually fed to maintain a hydrogen gas pressure of 50 kg/cm$^2$ for 8 hours. After the reaction, the hydrogen gas was purged and the catalyst was separated by filtration. The resulting hydrogenated copolymer was precipitated in methanol and was dried. The results of the analysis thereof are shown in Table 3.

According to the infrared analysis of the resulting hydrogenated copolymer, absorption bands were not observed for aromatic rings at 3025 cm$^{-1}$, 1493 cm$^{-1}$, 699 cm$^{-1}$, etc., which confirmed the hydrogenation of the aromatic rings.

Example 4

In accordance with the process of Example 3, the copolymer of Polymer 2 was hydrogenated to give a hydrogenated copolymer having high fluidity. The results of the analysis thereof are shown in Table 3.

Example 5

In accordance with the process of Example 3, the copolymer of Polymer 3 was hydrogenated to give a hydrogenated copolymer having high fluidity. The results of the analysis thereof are shown in Table 3.

Example 6

In accordance with the process of Example 3, the homopolymer of butadiene of Polymer 4 was hydrogenated to give a hydrogenated polymer. The results of the analysis thereof are shown in Table 3.

Table 3

| | Analysis of hydrogenated polymers | | | | | |
|---|---|---|---|---|---|---|
| | Average molecular weight | Period of hydrogenation (hr.) | Extent of hydrogenation (%)[*1] | | OH group content (meq/g) | [OH]number/ polymer molecule |
| | | | main chain | aromatic ring | | |
| Example 3 | 3500 | 8 | 99.5 | 98.2 | 0.55 | 1.9 |
| Example 4 | 3100 | 10 | 99.1 | 85.2 | 0.62 | 1.9 |
| Example 5 | 3900 | 40 | 99.4 | 99.5 | 0.52 | 2.0 |
| Example 6 | 2800 | 8 | 99.4 | — | 0.79 | 2.2 |

[*1]Extent of hydrogenation was measured by Infrared analysis and NMR (100 MHz 20 wt. % CS$_2$ solution).

Curing Operation

The curing reactions of the hydrogenated polymers of Examples 3, 4, 5 and 6 and Polymer 1 (unhydrogenated copolymer) and Polymer 4 (unhydrogenated homopolymer of butadiene) with diisocyanate were conducted. One hundred grams of each of the hydrogenated polymers and the unhydrogenated polymers was admixed with 0.1g of dibutyl-tin dilaurate and a specific amount of tolylenediisocyanate, and the reaction was conducted at 120° C under the pressure of 150 kg/cm$^2$ for 1 hour. The physical properties of the resulting cured products were measured by the method of Japanese Industrial Standard K-6301. The results are shown in Table 4. The electrical characteristics of the cured products were measured by the method of Japanese Industrial Standard K-6911. The results are shown in Table 5.

Table 4

| | Physical properties of the cured polymers | | | | |
|---|---|---|---|---|---|
| Sample | tolylene diisocyanate(g) | tensile strength (kg/cm$^2$) | elongation (%) | 300% modulus (kg/cm$^2$) | Hardness (JIS) |
| Example 3 | 4.8 | 80 | 480 | 46 | 67 |
| Example 4 | 5.9 | 54 | 335 | 42 | 52 |
| Example 5 | 4.5 | 34 | 840 | 14 | 41 |
| Preparation of Polymer 1 | 5.1 | .13 | 420 | 9 | 34 |
| Preparation of Polymer 4 | 8.1 | 22 | 220 | — | 39 |

Table 5

Electrical Characteristics of the Cured Polymers

| Sample | Dielectric constant 60 Hz 20° C | Dielectric constant 60 Hz 120° C | tan δ 60 Hz 20° C | tan δ 60 Hz 120° C | volume resistivity (Ω cm) 20° C | volume resistivity (Ω cm) 120° C | Breakdown voltage (in oil) (Kv/min.) | Arc resistance (sec.) |
|---|---|---|---|---|---|---|---|---|
| Example 3 | 2.30 | 1.96 | 0.0165 | 0.0007 | $1.04 \times 10^{18}$ | $1.30 \times 10^{14}$ | 22.5 | 165 |
| Example 6 | 3.02 | 2.69 | 0.028 | 0.0005 | $2.80 \times 10^{16}$ | $1.82 \times 10^{14}$ | 23 | 148 |
| Preparation of Polymer 1 | 3.07 | 2.68 | 0.022 | 0.023 | $2.12 \times 10^{15}$ | $3.49 \times 10^{11}$ | 21 | 89 |
| Preparation of Polymer 4 | 3.71 | 3.19 | 0.010 | 0.0040 | $3.25 \times 10^{15}$ | $1.78 \times 10^{12}$ | 24 | 94 |

As it is clear from Table 4, the cured hydrogenated butadiene-styrene copolymer prepared by the invention has excellent tensile strength and elongation compared with the cured unhydrogenated polymer. The cured hydrogenated polymer containing saturated rings (Examples 3 – 5) has lower 300% modulus and hardness values compared to those of the cured hydrogenated polymer containing no saturated ring (Examples 1 and 2.) Accordingly, the former copolymer has a rubber-like elasticity compared to the latter.

As it is clear from Table 5, the cured hydrogenated polymer prepared by the invention has a lower dielectric constant and tan δ, and a higher volume resistivity at both temperatures and higher arc resistance compared to the same values of the cured unhydrogenated polymers. The fact shows the former polymer is very superior than the latter as an electric insulating material. The cured hydrogenated copolymer containing saturated rings had lower dielectric constants and higher arc resistance compared to those of the cured hydrogenated polymer containing no saturated rings.

Example 7

Into a 200ml autoclave were charged 50.0g of polyhydroxylpolybutadiene of Example 1, 50.0g of cyclohexane, 0.25g of a catalyst of ruthenium supported on carbon of Example 1. The autoclave was purged with purified argon and the contents were heated to 150° C during 45 minutes. At 150° C as the normal state, pure hydrogen gas was fed into the autoclave and maintained under the pressure of 50 kg/cm² for the hydrogenation. After the predetermined period, the hydrogenated product was removed and the catalyst was separated by filtration. The solvent was evaporated and the product was purified by reprecipitation from a toluene-methanol medium. The product was dried at about 55° C in vacuum to obtain the hydrogenated product.

The results of the analysis of the resulting hydrogenated polymer are shown in Table 6.

Example 8

The process of Example 7 was followed except that a mixture of 45.0g of cyclohexane and 5.0g of water instead of 50g of cyclohexane was used. The hydrogenation was conducted to give a hydrogenated polymer. The results of the analysis of the resulting hydrogenated polymer are shown in Table 6.

Example 9

The process of Example 7 was followed except that a mixture of 40.0g of cyclohexane and 10.0g of water instead of 50.0g of cyclohexane was used. The hydrogenation was conducted as before to give the hydrogenated polymer. The results of the analysis of the resulting hydrogenated polymer are shown in Table 6.

Example 10

The process of Example 7 was followed except that a mixture of 25.0g of cyclohexane and 25.0g of water instead of 50.0g of cyclohexane was used. The hydrogenation was conducted as before to give the hydrogenated polymer. The results of the analysis of the resulting hydrogenated polymer are shown in Table 6.

Table 6

Analysis of the hydrogenated polymers

| | Catalyst for hydrogenation | Solvent type | Solvent amount(g) | Period of hydrogenation (hr.) | Extent of hydrogenation (%) | OH group content (meq/g) | initial rate of hydrogenation (% minutes) |
|---|---|---|---|---|---|---|---|
| Example 7 | 5% Ru-C | cyclohexane | 50.0 | 5 | 73.9 | 0.76 | 0.37 |
| Example 8 | 5% Ru-C | cyclohexane Water | 45.0 5.0 | 5 | 95.3 | 0.81 | 1.60 |
| Example 9 | 5% Ru-C | cyclohexane Water | 40.0 10.0 | 5 | 92.2 | 0.79 | 1.40 |
| Example 10 | 5% Ru-C | cyclohexane Water | 25.0 25.0 | 3.5 | 97.1 | 0.76 | 1.60 |

Having now fully described this invention, it will be apparent one of ordinary skill in the art that many changes and modifications can be made thereto without departing from the spirit or scope of the invention as set forth herein.

What is claimed as new and interested to be covered by Letters Patent is:

1. In a process of hydrogenating a polyhydroxyl conjugated diene unsaturated polymer, the improvement which comprises:
   hydrogenating said conjugated diene polymer over a metallic ruthenium catalyst.

2. The process of claim 1, wherein the polyhydroxyl unsaturated hydrocarbon polymer contains more than 50% 1,4-bonds.

3. The process of claim 1, wherein said polyhydroxyl unsaturated hydrocarbon polymer is hydrogenated with 0.01 – 1.0 wt % of said ruthenium catalyst.

4. The process of claim 1, wherein the hydrogenation is conducted at 20° – 150° C.

5. The process of claim 1, wherein said ruthenium catalyst is supported on a carrier of carbon, alumina, silica, silica-alumina, diatomeous earth, barium carbonate or calcium carbonate.

6. The process of claim 1, wherein said polyhydroxyl conjugated diene unsaturated polymer is a copolymer prepared from a comonomer containing an unsaturated ring.

7. The process of claim 1, wherein the solvent for the hydrogenation is a mixture of an organic solvent and water.

8. The process of claim 7, wherein the organic solvent is a hydrocarbon.

9. The process of claim 1, wherein the solvent for the hydrogenation is a hydrocarbon.

* * * * *